(12) United States Patent
Vengadesh et al.

(10) Patent No.: US 10,665,866 B2
(45) Date of Patent: May 26, 2020

(54) METHOD OF FABRICATING GRAPHENE-BASED/ALGAL BIOFILM ELECTRODE FOR APPLICATION IN A BIOPHOTOVOLTAIC DEVICE

(71) Applicant: UNIVERSITY OF MALAYA, Kuala Lumpur (MY)

(72) Inventors: Periasamy Vengadesh, Kuala Lumpur (MY); Siew Moi Phang, Kuala Lumpur (MY); Fong Lee Ng, Kuala Lumpur (MY); Mussoddiq Muhammad, Kuala Lumpur (MY); Adrian C. Fisher, Cambridge (GB); Yunus Kamran, Cambridge (GB)

(73) Assignee: UNIVERSITY OF MALAYA, Kuala Lumpur (MY)

( * ) Notice: Subject to any disclaimer, the term of this patent is extended or adjusted under 35 U.S.C. 154(b) by 55 days.

(21) Appl. No.: 15/532,765

(22) PCT Filed: Nov. 23, 2015

(86) PCT No.: PCT/MY2015/050144
§ 371 (c)(1),
(2) Date: Jun. 2, 2017

(87) PCT Pub. No.: WO2016/089198
PCT Pub. Date: Jun. 9, 2016

(65) Prior Publication Data
US 2018/0013149 A1 Jan. 11, 2018

(30) Foreign Application Priority Data
Dec. 3, 2014 (MY) .......................... PI 2014703632

(51) Int. Cl.
*H01M 14/00* (2006.01)
*H01M 4/86* (2006.01)
(Continued)

(52) U.S. Cl.
CPC ........... *H01M 4/86* (2013.01); *H01M 4/8825* (2013.01); *H01M 4/8878* (2013.01); *H01M 4/96* (2013.01);
(Continued)

(58) Field of Classification Search
CPC .... H01M 4/86; H01M 4/8825; H01M 4/8878; H01M 4/96; H01M 8/16; H01M 14/005; Y02E 60/527
See application file for complete search history.

(56) References Cited

FOREIGN PATENT DOCUMENTS

WO    WO-2010117844 A2 * 10/2010 ............. C12N 13/00

OTHER PUBLICATIONS

"Plastic | Definition of Plastic in English by Oxford Dictionaries." Oxford Dictionaries | English. Oxford Dictionaries, n. d. Web. Feb. 25, 2019. <https://en.oxforddictionaries.com/definition/plastic>. (Year: 2019).*

(Continued)

*Primary Examiner* — Maria Laios
(74) *Attorney, Agent, or Firm* — Preston Smirman; Smirman IP Law, PLLC (57) ABSTRACT

A method of preparing an electrode for use in a biophotovoltaic device, comprising the steps of: coating a self-assembled film on a substrate using Langmuir-Blodgett technique; and immersing the coated substrate into an microalgae culture, followed by incubating thereof to grow microalgae thereon hence obtaining a biofilm, characterised in that the self-assembled film is derived from graphene.

9 Claims, 8 Drawing Sheets

(51) Int. Cl.
*H01M 8/16* (2006.01)
*H01M 4/96* (2006.01)
*H01M 4/88* (2006.01)

(52) U.S. Cl.
CPC .......... *H01M 8/16* (2013.01); *H01M 14/005* (2013.01); *H01M 2004/8684* (2013.01); *Y02E 60/527* (2013.01)

(56) References Cited

OTHER PUBLICATIONS

Qingbin Zheng et al., "Transparent Conductive Films Consisting of Ultralarge Graphene Sheets Produced by Langmuir-Blodgett Assembly", ACS Nano, vol. 5, No. 7, 2011, pp. 6039-6051. (Year: 2011).*

Ji Won Suk et al., "Mechanical Properties of Monolayer Graphene Oxide", ACS Nano, vol. 4, No. 11, 2010, pp. 6557-6564. (Year: 2010).*

Bombelli, Paolo et al., Surface morphology and surface energy of anode materials influence power outputs in a multi-channel mediatorless bio-photovoltaic (BPV) system, Physical Chemistry Physics, vol. 14, The Royal Society of Chemistry, 2012, pp. 12221-12229.

Kim, Hyeri et al., Morphology control of surfactant-assisted graphene oxide films at the liquid-gas interface, Langmuir, vol. 30, American Chemical Society, Feb. 5, 2014, pp. 2170-2177.

Gunther, Darlene et al., Photosystem I on graphene as a highly transparent, photoactive electrode, Langmuir, vol. 29, American Chemical Society, 2013, pp. 4177-4180.

McCormick, Alistair J. et al., Photosynthetic biofilms in pure culture harness solar energy in a mediatorless bio-photovoltaic cell (BPV) system, Energy Environ. Sci., vol. 4, The Royal Society of Chemistry, 2011, pp. 4699-4709.

Ng, Fong-Lee et al., Algae biofilm on indium tin oxide electrode for use in biophotovoltaic platforms, Advanced Materials Research, vol. 895, 2014, pp. 116-121.

Niishio, Koichi et al., Light/electricty conversion by a self-organized photosynthetic biofilm in a single-chamber reactor, Appl. Microbiol. Biotechnol., vol. 86, 2010, pp. 957-964.

International Search Report dated Mar. 23, 2016.

Written Opinion of International Searching Authority dated Mar. 22, 2016.

International Preliminary Report on Patentability dated Jun. 6, 2017.

* cited by examiner

METHOD OF FABRICATING GRAPHENE-BASED/ALGAL BIOFILM ELECTRODE FOR APPLICATION IN A BIOPHOTOVOLTAIC DEVICE

CROSS-REFERENCE TO RELATED APPLICATION

The instant application is a national phase of PCT International Patent Application Serial No. PCT/MY2015/050144 filed Nov. 23, 2015, and claims priority to Malaysia Patent Application Serial No. PI 2014703632, filed Dec. 3, 2014, the entire specifications of both of which are expressly incorporated herein by reference.

FIELD OF INVENTION

The present invention relates to the field of biological photovoltaics. In particular, the invention provides a method of preparing an electrode, particularly anode, for use in a biological electrochemical system so as to harvest solar energy and generate electrical power.

BACKGROUND OF THE INVENTION

Biological photovoltaics (BPV) is an energy-generating technology which uses oxygenic photoautotrophic organisms, or fractions thereof, to harvest light energy and produce electrical power. In contrast to microbial fuel cells which generate electricity from the metabolic process of living microbes, biophotovoltaics produce electricity from light energy via light harvesting apparatus of photosynthetic organisms.

Algae are amongst the most efficient photosynthetic organisms with fast growth rates and tolerance in extreme environments. Nishio et al. (2010) proposed that it is likely that green algae and heterotrophic bacteria grew in the anode biofilm and formed layered structure. It was suggested that green algae and cyanobacteria cooperatively converted light energy into electricity.

Further, McCormick et al. (2011) disclosed a mediatorless biophotovoltaic system by virtue of using bacterial species capable of self-mediated extracellular electron transfer. Particularly, green algae or cyanobacteria strains were grown directly on an indium tin oxide-polyethylene terephthalate (ITO-PET) on anode in a sandwich type or an open air design BPV system. Besides, Ng et. al (2013) disclosed suitable strains of algae capable of forming biofilm on ITO and glass anode in a BPV device for electric power generation. Photosynthetic efficiency of the biofilms were determined.

It appears that anode material is crucial in determining power outputs in a BPV system. In this aspect, Bombelli P. et al. (2012) disclosed their study relating to surface morphology and surface energy of anode material including ITO-PET, stainless steel, glass coated with a conductive polymer and carbon paper. Apart from choosing a suitable anode material, method of treating anode for better adherence of biofilm derived from green algae or cyanobacteria was crucial in enhancing efficiency and power output of a BPV system. The abovementioned thin film or slides of ITO are usually formed via physical vapour deposition on solid surfaces. Particularly, they can be obtained by electron beam evaporation or sputter deposition technique. As such techniques are required to be conducted under vacuum condition, the production of the ITO thin film or slides requires skilled workmanship and specialized facilities hence lead to high production cost.

As an alternative, carbon-based films, such as films of graphene are highly sought-after due to its transparency and relatively lower electrical resistance properties comparing to ITO. The present invention provide method of preparing electrode with such a carbon-based biofilm and BPV device thereof.

SUMMARY OF THE INVENTION

Aspects of embodiments of the present invention are directed towards the use of anode having self-assembled, graphene-based biofilm in a biophotovoltaic device.

An embodiment of the invention provides viability of electrogenic biofilm on the anode of the biophotovoltaic device.

An embodiment of the invention provides biofilm acting an electron-conducting structure.

An embodiment of the invention provides an anode with porous film for lodging and growth of microalgae.

An embodiment of the invention provides a substrate having biofilm which is in electrical communication with a cathode to generate power output.

An exemplary embodiment of the present invention provides a biophotovoltaic device which achieves relative power increase of 118% and 189% in light and dark condition respectively, comparing to an ITO film.

One embodiment of the present invention describes a method of preparing an electrode for use in a biophotovoltaic device, comprising the steps of coating a self-assembled film on a substrate using Langmuir-Blodgett technique; and immersing the coated substrate into a culture containing microalgae, followed by incubating thereof to grow microalgae thereon hence obtaining a biofilm, characterised in that the self-assembled film is derived from graphene.

In the preferred embodiment, the method further comprises a step of drying the film.

In the preferred embodiment, the method further comprises a step of compressing the film to a surface pressure of 5 to 25 nM/m.

In the preferred embodiment, the method further comprises a step of spreading graphene on the surface of deionized water at a rate of 50 to 150 µL/minute.

In the preferred embodiment, the graphene is graphene oxide, reduced graphene oxide or a combination thereof.

In the preferred embodiment, the step of coating is conducted by vertically dipping or drawing the substrate through the liquid surface at a speed of 5 to 25 mm/minute.

In the preferred embodiment, the step of coating the substrate is repetitively conducted so as to form more than one layer.

In the preferred embodiment, the thickness of the coated film is 700 to 900 mm.

In the preferred embodiment, the pore size of the film is 1 to 4 µm.

In the preferred embodiment, the incubating step is conducted under 12 hours of light irradiation followed by 12 hours in darkness.

In the preferred embodiment, the microalgae is preferably selected from *Chlorella* sp., *Spirulina* sp., *Synechococcus* sp., *Coscinodiscus* sp., *Scenedesmus* sp., *Oocystis* sp., *Chlorococcum* sp. or any combination thereof.

In the preferred embodiment, the substrate is glass, paper, carbon paper, plastic, metal, alloy, ceramic and/or polymer.

At least one of the preceding objects is met, in whole or in part, by the present invention, in which one of the embodiments of the present invention describes a biophotovoltaic device comprising a transparent chamber, an anode electrode and a cathode electrode, the cathode electrode having at least one surface and an cathode electrical contact terminal, the anode electrode having at least one surface and an anode electrical contact terminal, the anode electrode prepared by method aforementioned which generates a biofilm adjacent to at least one surface of the anode electrode and in electrical communication therewith, the chamber configured to contain microalgae-culture. In the preferred embodiment, the cathode is derived from glass substrate coated with platinum.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DESCRIPTION OF THE INVENTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

The present invention describes a method of preparing an electrode for use in a biophotovoltaic device, comprising the steps of coating a self-assembled film on a substrate using Langmuir-Blodgett technique; and immersing the coated substrate into a culture containing microalgae, followed by incubating thereof to grow microalgae thereon hence obtaining a biofilm, characterised in that the self-assembled film is derived from graphene.

Self-assembled film of amphiphilic organic molecules are molecular assemblies formed spontaneously on surfaces by adsorption and are organized into more or less large ordered domains. In some cases molecules that form the film do not interact strongly with the substrate. To tackle this problem, molecules possessing functional group that has strong affinity to the substrate thereby anchoring the molecules thereon are preferred. Apart from that, it is preferred that the molecules exhibit sufficient, or even superior electrical, mechanical, thermal and chemical properties for the use in a photovoltaic device. An embodiment of the invention preferably coats a substrate with self-assembled film derived from graphene, particularly graphene oxide or reduced graphene oxide, with reduced graphene oxide having relatively enhanced electrical conductivity. It is preferred that the derived graphene has substantial oxygen moieties that could impart hydrophilic character therein so as to enhance its affinity to the substrate. In this context, graphene oxide or reduced graphene oxide are amphiphilic molecules with their carbon moieties being the hydrophobic 'head' while oxygen moieties being the hydrophilic 'tail'. The reduced graphene oxide used can be effectively reduced from graphene oxide using reducing agent such as, but not limited to. hydrazine hydrate, hydroquinone, sodium borohydride and hydrogen sulphide. More preferably, the reduced graphene oxide can be effectively reduced from graphene oxide by means of phytochemical compounds having strong reduction capabilities generated from autotrophic microorganisms, for instance, *Ocimum tenuflorum*, but not limited thereto.

The aforementioned embodiment describes a method comprises a step of coating a self-assembled film on a substrate using Langmuir-Blodgett technique. The substrate preferably has high surface energy, more preferably being hydrophilic, such as, but not limited to, glass. Material such as paper, carbon paper, plastic, metal, alloy, ceramic and polymer such as polyethylene terephthalate, polytetrafluoroethylene can also be used as substrate in the present invention.

In the present invention, Langmuir-Blodgett technique used herein is capable of depositing one or more homogeneous layers of the derived graphene to form the film. The method is preferably conducted using a Langmuir-Blodgett trough equipped with barrier bars commonly used in the prior art. In the preferred embodiment, prior to the coating step, there is a step of dripping the derived graphene on the liquid surface at a rate of 50 to 150 μL/minute. To avoid contamination, the liquid is preferably pure form of solvent, such as deionized water. Further, it is preferred to gather the spread derived graphene so as to form a domain compact with derived graphene molecules. This can be achieved by compressing the spread derived graphene to a surface pressure of 5 to 25 nM/m by means of adjusting the distance between the barrier bars. Thereinafter, a Langmuir-Blodgett film formed an air-water interface, with the liquid surface known as sub-phase hereinafter. In particular, the hydrophobic 'head' preferably exposes to the air while hydrophilic 'tail' favours the sub-phase. The Langmuir-Blodgett film is preferably left to stabilize for approximately 15 minutes. Thereinafter, the air-water interface is considered ready for use in the present invention for the subsequent coating step.

Pursuant to the preceding description, the coating step is preferably conducted by vertically dipping the substrate through the air-water interface, passing through the Langmuir-Blodgett film at a rate of 5 to 25 mm/minute. The derived graphene preferably interacts with the substrate at the air-water interface. In particular, hydrophobic 'head' preferably exposes to the air while hydrophilic 'tail' is attracted to the substrate. As dipping continues, the Langmuir-Blodgett film is 'pulled' and transferred onto the substrate substantially forming a first layer thereon. Consequently, a second layer of derived graphene can be coated on top of the first layer by drawing the substrate away from the liquid. To achieve certain thickness of the film, the coating step can be repetitively conducted so as to obtain more than one layer assembled vertically in head-to-tail, head-to-head or tail-to-tail manner to the preceding layer. In the preferred embodiment, at least 6 layers are formed. Further, a drying step is conducted to ensure each of the layers are intact to the substrate. Particularly, the drying step is conducted under approximately 60° C. in an oven overnight. Further, an annealing step can be conducted by heating the dried substrate at a rate of 10° C./minute to achieve 200 to 400° C. The annealing step omits the use of accompanying gas hence substantially reducing the cost of production.

As setting forth, the coated substrate provides viability of electrogenic biofilm. In this context, the film on the substrate is known as biofilm when microorganisms, preferably photosynthetic microorganisms reside thereon. Photosynthetic microorganisms capable of increasing exoelectrogenic activities are preferred. To obtain the biofilm, an embodiment of the method further comprises a step of immersing the coated substrate in a microalgae culture. In the present invention, the one or a combination of microalgae are preferably acquired from The University of Malaya Algae Culture Collection (UMACC) and Culture Collection of Marine Phytoplankton (CCMP), USA. In particular, the microalgae used is preferably isolated from the aerobic pond from oil palm mill effluent treatment. More preferably, the microalgae is preferably selected from *Chlorella* sp., *Spirulina* sp., *Synechococcus* sp., *Coscinodiscus* sp., *Scenedesmus* sp., *Oocystis* sp., *Chlorococcum* sp. or any combination thereof. For example, the microalgae can be selected from *Synechococcus elongatus* (UMACC 105), *Spirulina platensis* (UMACC 159), *Chlorella vulgaris* (UMACC 001), *Scenedesmus* sp. (UMACC 036), *Scenedesmus quafricauda* (UMACC 041), *Chlorella vulgaris* (UMACC 051), *Scenedesmys* sp. (UMACC 068), *Oocystis* sp. (UMACC 074), *Chlorococcum oviforme* (UMACC 110), *Chlorococcum* sp. (UMACC 207), *Chlorella* sp. (UMACC 255), *Chlorella* sp. (UMACC 256), *Chlorella* sp. (UMACC 258), *Chlorella* sp. (UMACC 313), *Coscinodiscus granii* (CCMP 1817) and *Coscinodiscus wailesii* (CCMP 2513). In particular, the microalgae grown in Bold's Basal Medium, Kosaric Medium, Prov Medium or f/2 Medium.

It is found that the microalgae substantially lodges in pores provided by the film derived from graphene thereby adhering on the coated substrate, forming the biofilm aforementioned. Biofilm composed from different microalgae will have varying thickness, and the dimension of the substrate should take such variation in size into consideration.

Further, the immersing step is preferably followed by incubating the immersed substrate in microalgae culture to promote growth of the adhered microalgae. In the preferred embodiment, the incubating step is conducted under 12 hours of light irradiation followed by 12 hours in darkness. In particular, the light irradiation intensity is preferably 30 to 40 µmol photons $m^{-2}$ $s^{-1}$ More particularly, the light irradiation can be generated by a white emitting device such as fluorescent lamp, LED lamp, gas discharge lamp or the like. Further, the incubating step is preferably accompanied by shaking the incubator, or a container adapted for use as the incubator, at 100 to 130 rpm at temperature of 25° C. Means for shaking the incubator can be adapted to provide the shaking motion. For incubation in darkness, the incubator is preferably covered by dark cloth and/or placed in a dark room. Pursuant to the incubating step, growth of the microalgae was monitored based on optical density of 0.5 at 620 nm correlating with chlorophyll-a (chl-a) content.

Figure 4:
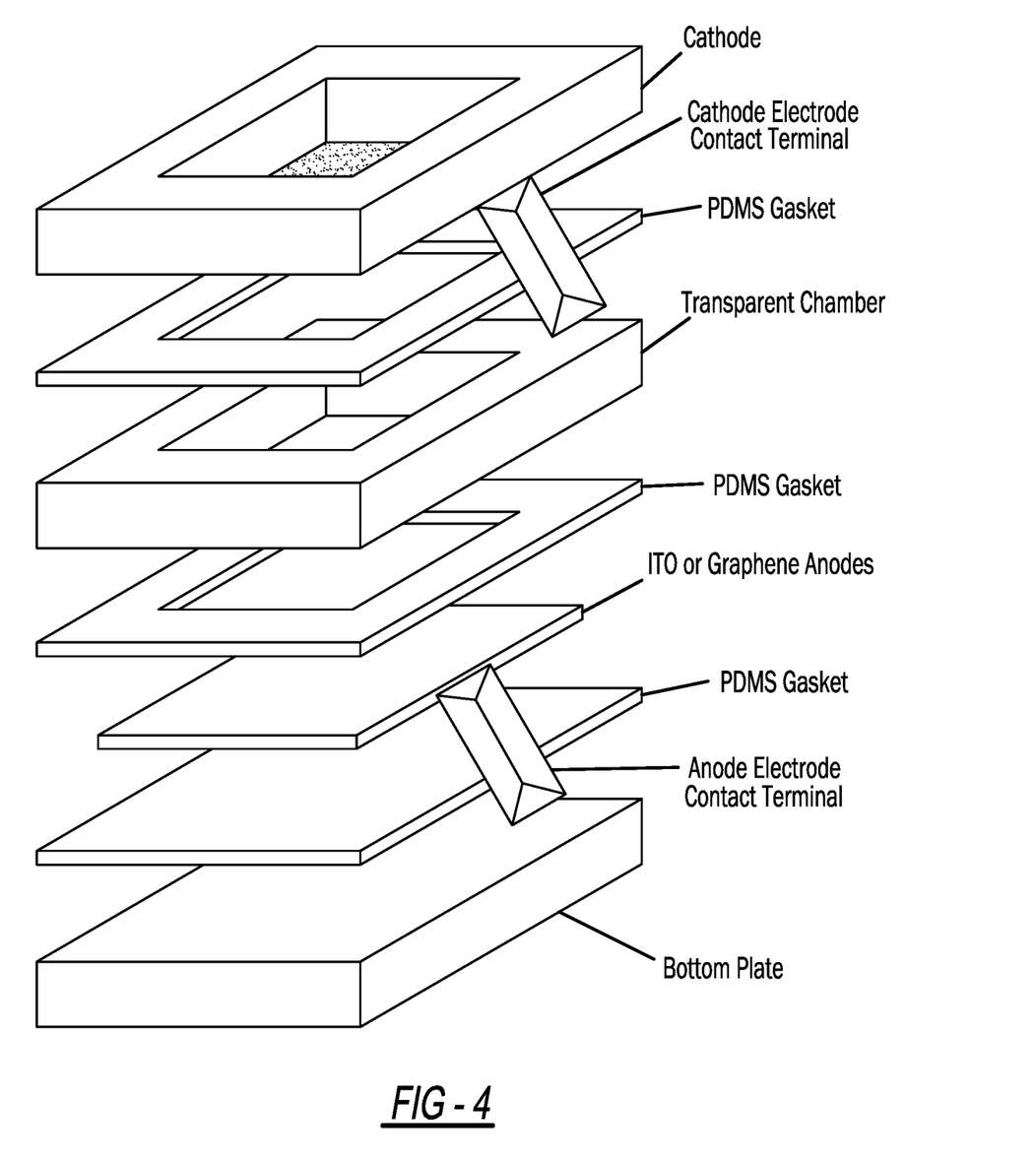
FIG. 4 shows an exploded view of a biophotovoltaic device in one of the preferred embodiment.

An embodiment of the indention is a bio photovoltaic device, as shown in FIG. 4, comprising a transparent chamber, an anode electrode and a cathode electrode, the cathode electrode having at least one surface and an cathode electrical contact terminal, the anode electrode having at least one surface and an anode electrical contact terminal, the anode electrode prepared by method aforementioned having a biofilm adjacent to at least one surface of the anode electrode and in electrical communication therewith, the chamber configured to contain microalgae culture. More preferably, the cathode electrode and anode electrode served as two parallel side walls sandwiching the chamber therebetween. The gaps in between the electrodes and chamber is sealed using polydimethylsiloxane gaskets. As such, the biophotovoltaic device in the preferred embodiment allows direct contact of the anode electrode with the microalgae thereby lowering internal potential losses. As a result, a higher power output can be achieved. As set forth in preceding description, the anode electrode is preferably the glass substrate coated with biofilm whilst the cathode electrode is preferably glass substrate coated with platinum. The cathode electrical terminal and anode electrical terminal substantially connects to external circuit of the device via copper wires and crocodile clips. It is also important to note that the chamber is transparent so as to expose the microalgae inside the chamber to white light. In particular, the transparent chamber is derived from polymethyl methacrylate-based material, but not limited thereto.

EXAMPLE

Example 1

Preparation of Reduced Graphene Oxide Film on Glass Substrate 2 mg of reduced graphene oxide was mixed with 1 mL of methanol (99% methanol) in a vial. The vial was sealed and sonicated for 10 hours to obtain a suspension of reduced graphene oxide. The reduced graphene oxide was dripped onto deionized water surface at a rate of 100 µL/minute for 1000 µL using a micro syringe to form a self-assembled layer spreaded on deionized water. A tissue wetted with methanol was used to spread methanol vapour from a distance of 0.5 cm from the layer to reduce clouded area of reduced graphene oxide on the water surface.

Figure 1:
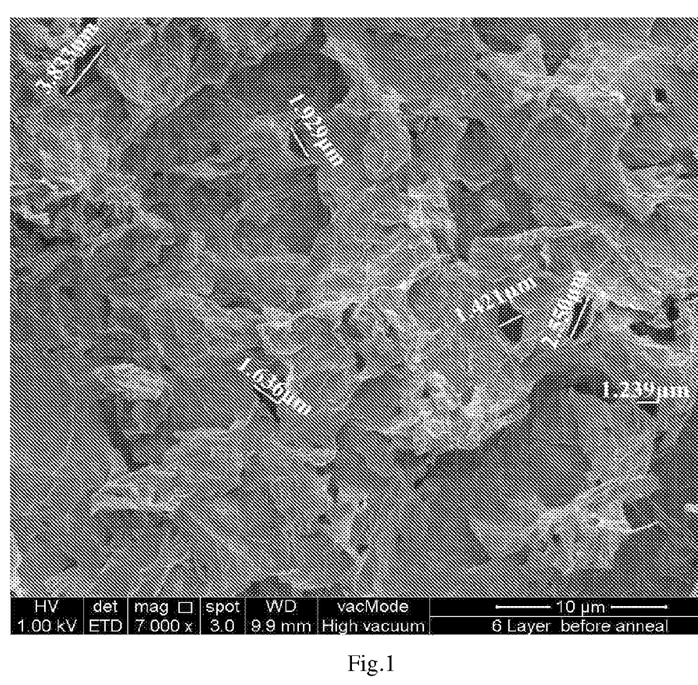
FIG. 1 shows FESEM micrograph of film derived from reduced graphene oxide (RGO) in one of the preferred embodiment.

Reduced graphene oxide film was coated on a glass substrate using a round-type NIMA LB trough (model 2220) from NIMA Technology, UK. Particularly, the trough was cleaned with chloroform and methanol. The coating step was conducted in a clean and dust-free clean room environment (ISO class 6). Thereinafter, barriers of the trough were adjusted to compress the spread layer at 15 $cm^2$/minute to achieve a surface pressure of 10 mN/m. Subsequently, a glass substrate (3.5 cm×3.5 cm) was dipped vertically at a rate of 20 mm/minute through the reduced graphene oxide layer. Thereinafter, the reduced graphene oxide layer was pulled and adhered onto the glass substrate, forming a film thereon. The coated substrate was then dried at 60° C. in an oven for 12 hours. The coating step, followed by the drying step was sequentially repeated to obtain 6 layers of reduced graphene oxide film. The resulting film has a thickness of approximately 809 mm. The resulting film has a resistance of 4.5×10$^5$Ω/sq while conductivity of the resulting film was 2.74 S/m. Further, pore sizes of the reduced graphene oxide film ranges from 1 to 4 μm, as showed in FESEM image in FIG. 1.

Example 2

Preparation of Biofilm

Green algae *Chlorella* sp. (UMACC 313) was grown in Bold's Basal Medium. 100 mL of exponential phase cultures having optical density of 0.5 at 620 nm ($OD_{620\,nm}$) was used. The culture was placed into 200 mL sterile staining jars. The coated substrate prepared in Example 1 was immersed into the staining jar to be in contact with the microalgae culture. The substrate was then transferred into an incubator operated at 25° C. In the incubator, the coated substrate was illuminated by a white fluorescent lamp (at intensity of 30 μmol m$^{-2}$ s$^{-1}$) for 12 hours, followed by 12 hours in darkness to facilitate growth of algae biofilm thereon.

Figure 2:
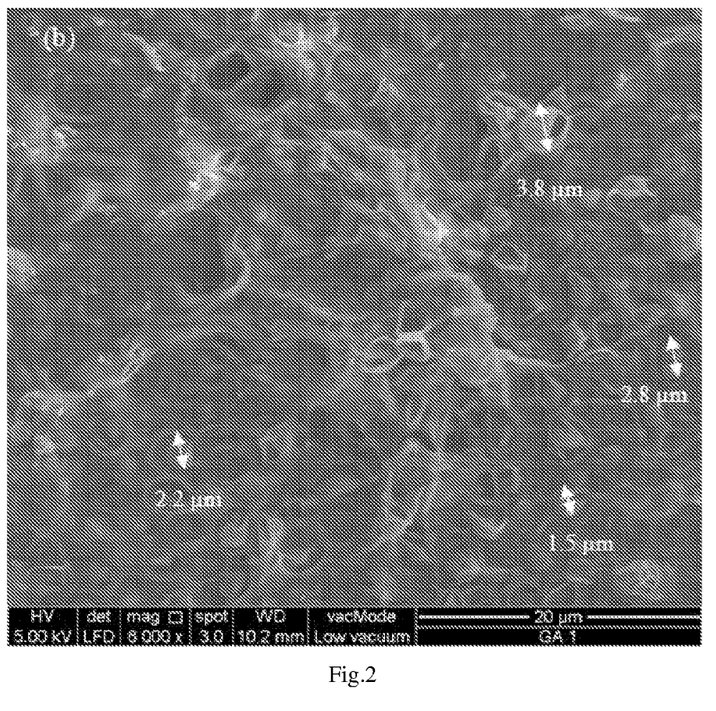
FIG. 2 shows FESEM micrograph of biofilm derived from reduced graphene oxide (RGO) adhered with *Chlorella* sp. In one of the preferred embodiment.
Figure 3:
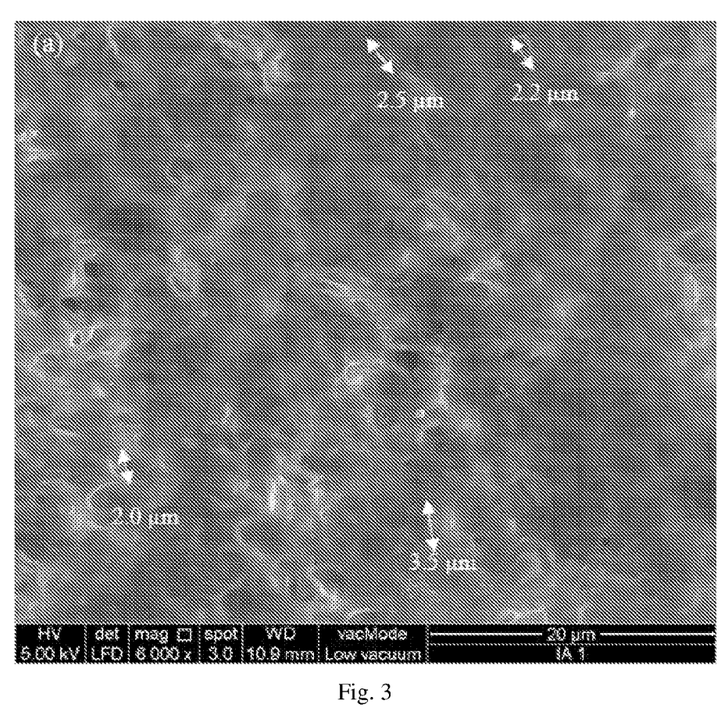
FIG. 3 shows FESEM micrograph of ITO film adhered with the same microalgae as used in generation of biofilm in FIG. 2.

A ITO film immersed in the same microalgae culture was used as comparison. Comparing FIG. 2 and FIG. 3, evidently biofilm in the present invention demonstrates higher amount of microalgae lodging.

Example 3

Biophotovoltaic Device Set-Up and its Operation

A biophotovoltaic device as shown in FIG. 4 comprises a platinum-coated glass cathode, a transparent chamber, an anode defined by glass substrate coated with biofilm as prepared in Example 1 and 2. The cathode was placed in parallel with the anode, in which the chamber was placed in between the electrodes. Cavity of the chamber was filled with algae culture medium, while polydimethylsiloxane gaskets were used to seal the cavity. The biophotovoltaic device served as a platform to harvest solar energy. Crocodile clips and copper wire were used to connect the anode and cathode to external circuit comprising means of measuring current output, light intensity and resistance. The device with anode having ITO film as mentioned in Example 2 was prepared the same way for comparison purpose.

Prior to operation, the chamber was filled with fresh medium and maintained at temperature of 25° C. For light cycle measurement, the device was exposed to light irradiance of 30 μmol photons m$^{-2}$ s$^{-1}$. For dark cycle measurement, the device was placed in a dark room and covered with black cloth. To ensure complete darkness, a light meter (LI-250A, Licor) was used to detect presence of light in the darkness. The reading given by the light meter was shown as zero. After dark adaptation for 15 minutes, current output was measured using a multimeter (Agilent U1251B). Polarization curves were generated for each algae strain by applying different resistance (10 MΩ, 5.6 MΩ, 2 MΩ, 560 kΩ, 240 kΩ, 62 kΩ, 22 kΩ, 9.1 kΩ, 3.3 kΩ and 1.1 kΩ) loads to the external circuit. The device with anode having ITO film was operated the same way for comparison purpose.

Figure 5:
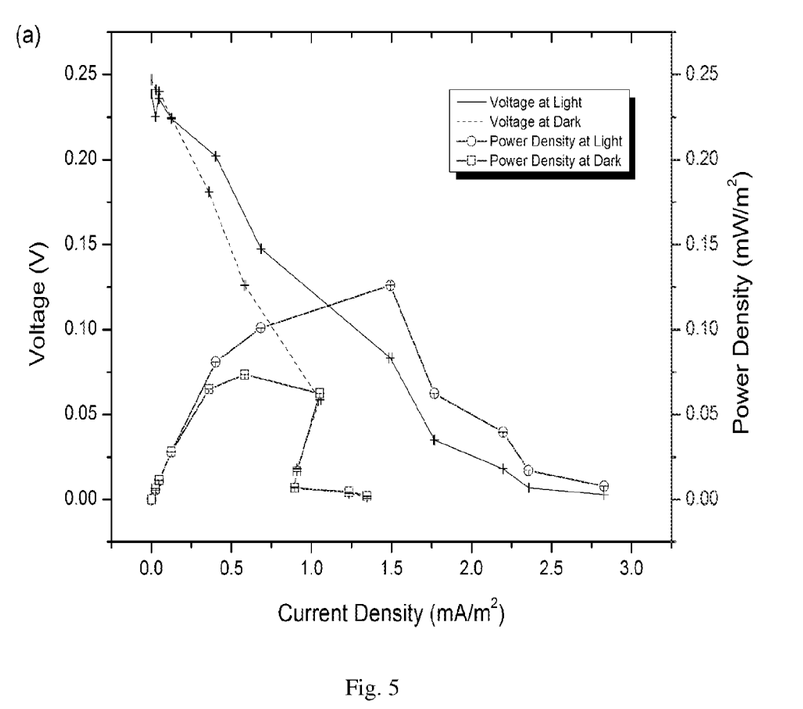
FIG. 5 shows polarization curve derived from biophotovoltaic device having anode electrode with the biofilm in FIG. 2.
Figure 6:
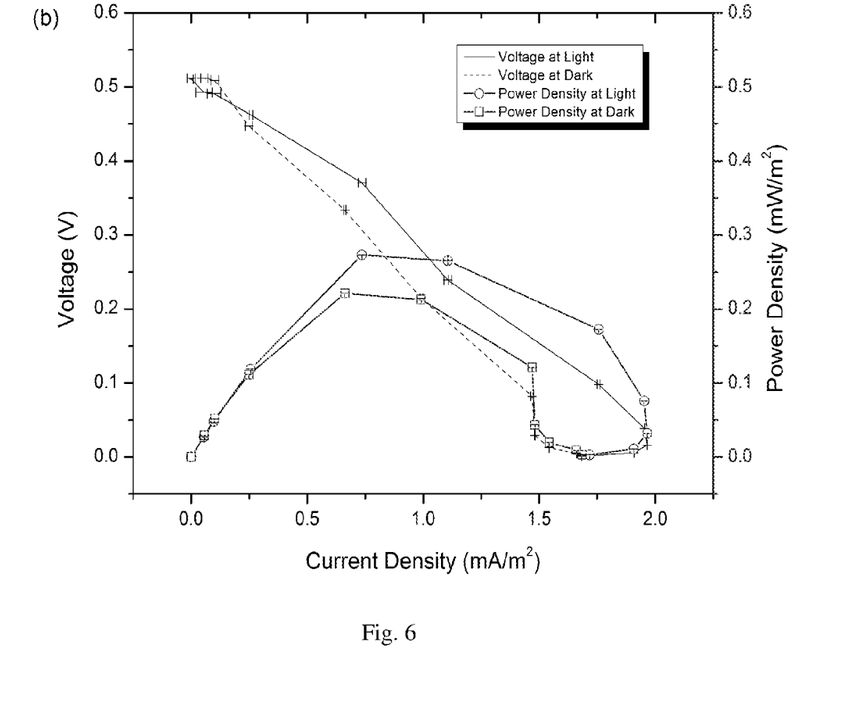
FIG. 6 shows polarization curve derived from biophotovoltaic device having anode electrode with the ITO film in FIG. 3.

Datas from polarization curves as shown in FIGS. 5 and 6 were sumriarized in Table 1. According to FIG. 5, peak power output for the device having reduced graphene oxide biofilm produced 0.273 mWm$^{-2}$ at a current density of 0.735 mAm$^{-2}$.

TABLE 1

Maximum current density and maximum power density for ITO and reduced graphene oxide biofilm based biophotovoltaic device in light and dark condition.

| Anode | Condition | Maximum current density (mA/m$^2$) | Maximum power density (mW/m$^2$) |
|---|---|---|---|
| ITO | Light | 2.283 ± 0.101 | 0.125 ± 0.033 |
| Reduced | Dark | 1.347 ± 0.383 | 0.0736 ± 0.005 |
| graphene | Light | 1.966 ± 0.141 | 0.273 ± 0.025 |
| oxide biofilm | Dark | 1.684 ± 0.380 | 0.213 ± 0.0171 |

Figure 7:
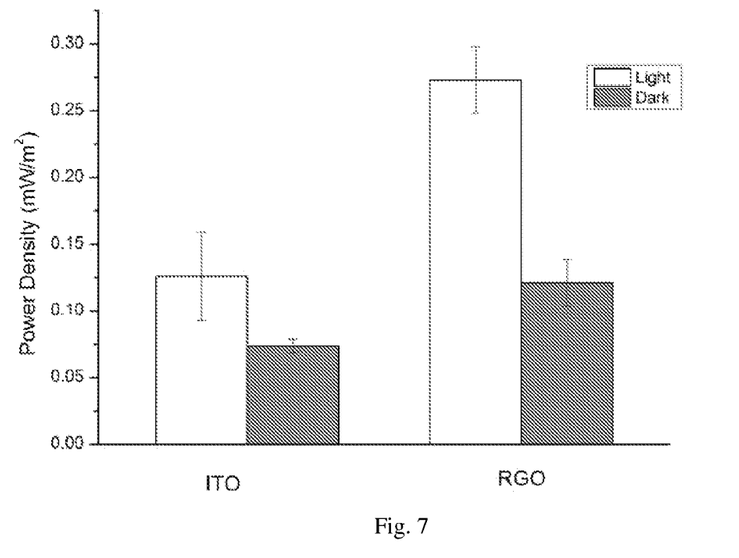
FIG. 7 shows graph of comparison of peak power outputs for biophovoltaic devices having anode electride with biofilm in FIG. 2 and ITO film in FIG. 3.

According to FIG. 7, in the dark cycle, there is an increase in 0.139 mWm$^{-2}$ between devices having ITO and reduced graphene oxide biofilm anodes. In the light cycle, there is an increase in 0.1481 mWm$^2$ between devices having ITO and reduced graphene oxide biofilm anodes. It was observed that the device with reduced graphene oxide biofilm anode exhibited an increase of 118% in power density when illuminated with light and increase of 189% in power density in the darkness.

Figure 8:
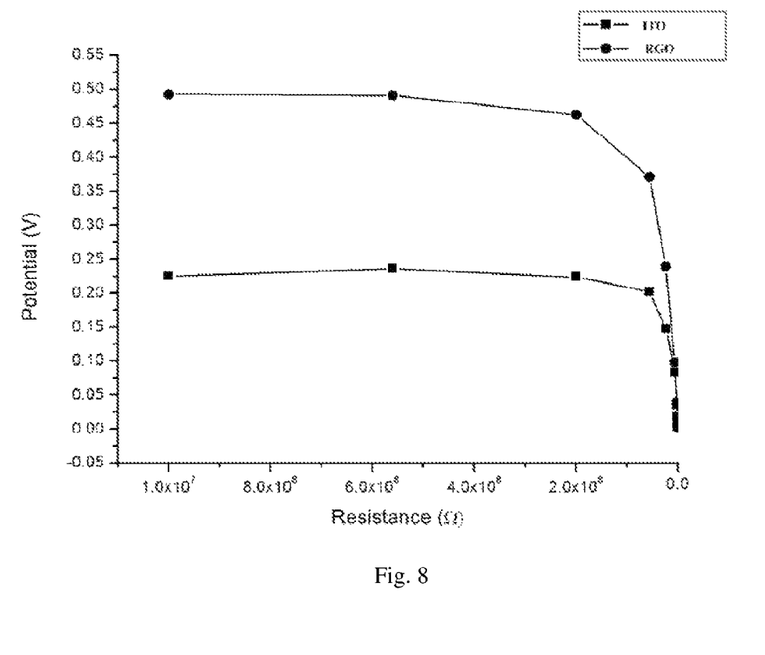
FIG. 8 shows graph of comparison of potential versus resistance measured when light is irradiated to the biophotovoltaic devices having ITO film on anode and reduced graphene oxide (RGO) biofilm on anode.
Figure 9:
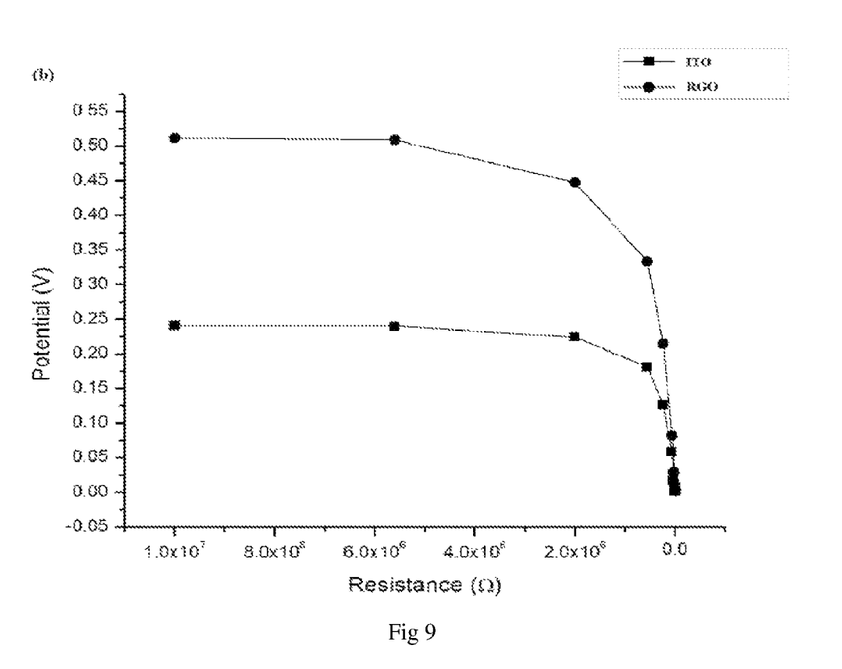
FIG. 9 shows graph of comparison of potential versus resistance measured when no light is irradiated (darkness) to the biophotovoltaic devices having ITO film on anode and reduced graphene oxide (RGO) biofilm on anode.

According to FIGS. 8 and 9, the potential across the terminals in the device having reduced graphene oxide biofilm anode demonstrated higher value (510 mV) compared to the device having ITO film anode (238 mV). Further, device having anode with reduced graphene oxide biofilm showed significant increase of potential for all resistor values.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

The invention claimed is:

1. A method of preparing an electrode for use in a biophotovoltaic device, comprising the steps of:
   coating a self-assembled film on a substrate using a Langmuir-Blodgett technique;
   wherein the step of coating the substrate is repetitively conducted so as to form a plurality of layers of the self-assembled film;
   wherein the self-assembled film include a plurality of pores formed therein;
   immersing the coated substrate into a microalgae culture;
   wherein the microalgae culture is disposed within the pores and adheres to the substrate; and
   incubating the immersed and coated substrate to grow microalgae thereon so as to produce a biofilm;
   wherein the self-assembled film is derived from graphene;
   wherein the graphene is reduced graphene oxide.

2. The method according to claim 1, further comprising the step of drying the self-assembled film.

3. The method according to claim 1, further comprising the step of compressing the self-assembled film to a surface pressure in a range of 5 to 25 nM/m.

4. The method according to claim 1, further comprising the step of dripping the reduced graphene oxide on a surface of deionized water at a rate of 50 to 150 μL/minute to form a layer.

5. The method according to claim 1, wherein the step of coating is conducted by vertically dipping or drawing the substrate through a water surface at a speed in a range of 5 to 25 mm/minute.

6. The method according to claim 1, wherein the incubating step is conducted under 12 hours of light irradiation followed by 12 hours in darkness.

7. The method according to claim 1, wherein the substrate is selected from the group consisting of glass, paper, carbon paper, metal, alloy, ceramic, polymers and combinations thereof.

8. The method according to claim 1, wherein the microalgae is selected from the group consisting of *Chlorella* sp., *Spirulina* sp., *Synechococcus* sp., *Coscinodiscus* sp., *Scenedesmus* sp., *Oocyslis* sp., *Chlowcoccum* sp. and combinations thereof.

9. A biophotovoltaic device, comprising:
a transparent chamber;
an anode electrode; and
a cathode electrode;
wherein the cathode electrode includes at least one surface and a cathode electrical contact terminal;
wherein the anode electrode includes at least one surface and an anode electrical contact terminal;
wherein the anode electrode is prepared by a method according to claim 1 so as to generate a biofilm adjacent to at least one surface of the anode electrode and being in electrical communication therewith;
wherein the chamber is configured to contain a microalgae-culture.

* * * * *